United States Patent

[11] 3,598,491

[72] Inventors Walther Hess
Dilsberg-Neuhof;
Dieter Frohlich, Neckargemund; Winfried Svenson, Schwetzingen, all of, Germany
[21] Appl. No. 792,866
[22] Filed Jan. 21, 1969
[45] Patented Aug. 10, 1971
[73] Assignee Eltro GmbH & Co.
Gesellschaft fur Strahlungstechnik,
Heidelberg, Germany
[32] Priority Jan. 19, 1968
[33] Germany
[31] E26356/42cGbm

[54] LASER TRANSMITTER AND RECEIVER DEVICE
5 Claims, 1 Drawing Fig.

[52] U.S. Cl. .................................... 356/4, 250/199
[51] Int. Cl. .................................... G01c 3/02
[50] Field of Search .................................... 356/4, 5, 3; 250/199

[56] References Cited
UNITED STATES PATENTS

| | | | |
|---|---|---|---|
| 3,514,620 | 5/1970 | Wiggerman | 356/4 X |
| 3,516,743 | 6/1970 | McKown | 356/4 X |

*Primary Examiner*—Rodney D. Bennett, Jr.
*Assistant Examiner*—J. M. Potenza
*Attorney*—Waters, Roditi, Schwartz & Nissen

ABSTRACT: Laser-transmitting-receiving apparatus which includes a transmitter and a receiver. In the transmitter the laser beam path is divided into three parallel sections, the first and second of which lie in a common plane and the second and third of which lie in a common plane. The third section exits from the apparatus. In the first section is a Q-switch prism and a deflector, In the second section is a deflector, a ruby rod and a plane plate resonator. In the third section is a deflector and a telescopic optical arrangement. The receiver provides a beam part including two consecutive and parallel sections. In the first section is a receiving objective and an aperture-providing device as well as a deflecting mirror. In the second part is a deflecting mirror, a lens, an interference filter and a photomultiplier.

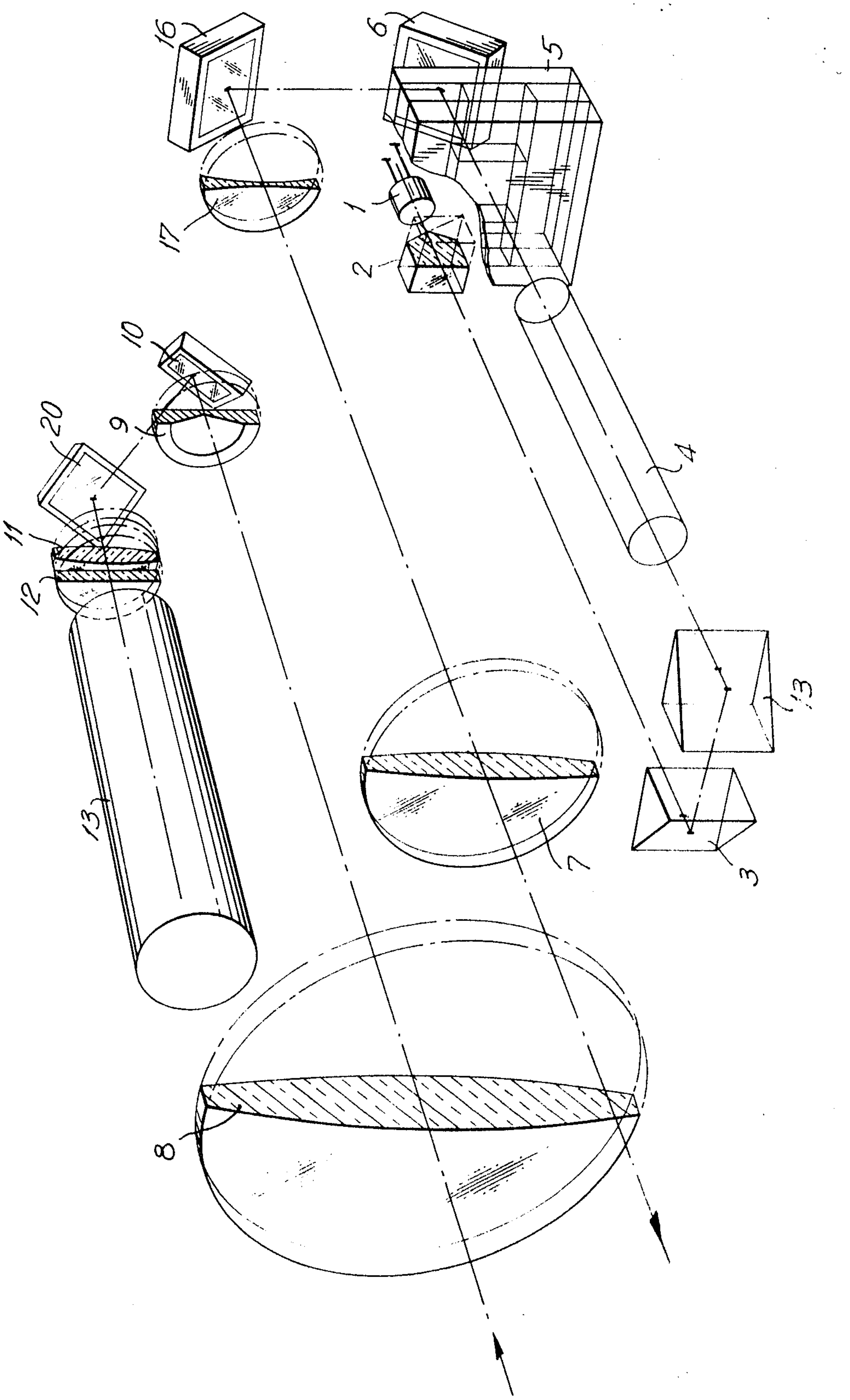
16
6
5
1
2
17
10
20
9
11
12
4
13
7
3
13
8

LASER TRANSMITTER AND RECEIVER DEVICE

This invention relates to a laser-transmitting-receiving unit for a rangefinder.

The individual parts for a laser-transmitting-receiving unit are usually arranged on two parallel axes. This arrangement requires that the total equipment be of substantial length which renders installation particularly in armored vehicles more difficult.

An object of the invention is to provide for arranging the individual parts of the equipment in a way that on the one hand the overall length of the beam paths which is subject to the optoelectronic performance of the unit will be preserved while on the other hand the space requirements will be kept at a minimum.

According to the invention, the parts belonging to the receiving unit will be arranged in a way that the beam path of the arriving beams will be split in two parallel but inversely arranged parts and the parts belonging to the transmitting unit will be arranged in a way that the beam path of the transmitting beam will be divided into three parallel parts, of which two succeeding parts each lie in one plane and are inversely arranged.

This arrangement allows to reduce the length of the overall unit to approximately one third of the length heretofore required.

In order to keep the cross section of the overall unit within modest limits as well, it is proposed to arrange the parts in a way that the plane of the first and second part of the beam path of the transmitting unit and the plane of the second and third part of the beam path of the transmitting unit are vertical to one another and that the parts of the receiving unit lie in the angle included by the two planes.

For the moment it does not matter how the parts of the receiving unit are arranged in detail. The spice will, however, most favorably be utilized if all parts of the receiving unit are arranged in one plane, which is inclined in an angle of 45° vis-a-vis the plane of the second and third part of the beam path of the transmitting unit and if the first part of the beam path of the receiving unit is arranged at the level of the third part of the beam path of the transmitting unit.

Further details will be seen in the attached drawing wherein the illustrated equipment is composed of a transmitting and a receiving unit.

The transmitter consists of the rotating Q-switch prism 2, the deflecting prisms 3, 13, the ruby rod 4 and the plane plate resonator 5. The phototransistor 1 is designed to measure the exact point of time of generation of the giant impulse.

Emanating from the Q-switch prism 2, the beam path at first runs in two parallel partial beams. Having passed the plane plate resonator 5, the beam path is bent 180° with the help of two dielectric deflecting mirrors 6, 16. These deflecting mirrors may be replaced by deflecting prisms. In the now existing third partial beam path lies a telescope 17, 7 for reducing the divergence of the transmitting beam of the laser transmitter.

The three partial beam paths are located in two different planes, so that a plane passed through the second and third partial beam paths is vertical to the plane passed through the first and second partial beam paths and such that the third partial beam path lies above the second.

In the receiving unit, there are only two partial beam paths. The receiving beam passes through the objective 8 and enters the equipment. After having passed through an interposed aperture 9, it reaches a deflecting mirror 10. By this deflecting mirror, the beam is directed at an angle of approximately 45° to the horizontal towards a mirror 20 which in its turn deflects this beam parallel to the optical axis of the objective 8 but in opposite direction to the incoming beam. Subsequently the beam passes through a collective lens 11 and an interference filter 12 and then reaches the photomultiplier tube 14.

The construction of the present invention is especially intended for use in a closed vehicle in which the very limited space must be taken into account. In such environment, it is not possible to arrange the individual parts of the instrument one behind the other without substantially limiting the possibilities of use. It is also required that the entry pupil and outlet pupil be as close together is possible. Therefore, emitted beam goes out through objective 7 and the reflected beam enters through objective 8 and is folded at deflective mirror 10 to avoid the otherwise long paths previously required which is not suitable cramped gun turret.

The arrangement of the invention presents a solution resulting from a whole series of tests and considerations directed to preserving the optically most favorable length of the light beam while providing an extraordinarily compict and short construction. There results an optimal optical transmission with an optimal spatial arrangement.

We claim:

1. Laser-transmitting-receiving apparatus comprising transmitting means for generating a laser beam and guiding the same along a beam path including first, second and third consecutive and parallel parts whereof the third part exits from the apparatus, said first and second and said second and third parts being coplanar and being in their respective planes oppositely directed; and receiving means adapted for receiving the beam when reflected from a target and guiding the received beam along a beam path including first and second consecutive parallel and oppositely directed sections.

2. Apparatus as claimed means claim 1 wherein said respective planes are perpendicular to each other and define an angle in which said receiving means is located.

3. Apparatus as claimed in claim 2 wherein the said first and second sections are in a plane which is at approximately 45° to the other planes.

4. Apparatus as claimed in claim 2 wherein said receiving means includes a receiving objective, aperture means and deflecting means forming said first section, said received beam passing through said aperture means to said deflecting means, and deflecting means, lens means, an interference filter and a photomultiplier forming said second section, the beam passing through said deflecting means, said lens means, and said interference filter to said photomultiplier.

5. Apparatus as claimed in claim 1 wherein said transmitting means comprises a Q-switch prism and deflection means forming said first part; said deflection means of said transmitting means being located to receive the beam output of said Q-switch prism, deflecting means, a ruby rod, a plane plate resonator, and further deflecting means forming said second part, the beam in said transmitting means passing through said deflecting means, said ruby rod, said plane plate resonator, and said further deflecting means of said second part; and deflecting means and telescopic means forming said third part; the beam in said transmitting means passing through said deflecting means and said telescopic means of said third part, said deflecting means cooperating with each other to deflect the beam between parts.